United States Patent [19]

Takano

[11] Patent Number: 5,530,873
[45] Date of Patent: Jun. 25, 1996

[54] METHOD AND APPARATUS FOR PROCESSING INTERRUPTION

[75] Inventor: Toshiya Takano, Hokkaido, Japan

[73] Assignee: Hudson Soft Co. Ltd., Japan

[21] Appl. No.: 100,753

[22] Filed: Aug. 2, 1993

[30] Foreign Application Priority Data

Oct. 2, 1992 [JP] Japan .................................. 4-289251

[51] Int. Cl.[6] .................................................. G06F 13/00
[52] U.S. Cl. ........................ 395/733; 395/500; 395/734; 395/775
[58] Field of Search ................................ 395/733, 734, 395/775, 500, 425

[56] References Cited

U.S. PATENT DOCUMENTS

| | | | |
|---|---|---|---|
| 4,103,329 | 7/1978 | Davis et al. | 364/200 |
| 4,410,939 | 10/1983 | Kawakami | 364/200 |
| 4,434,461 | 2/1984 | Puhl | 364/200 |
| 4,905,190 | 2/1990 | Yokoyama | 364/900 |

FOREIGN PATENT DOCUMENTS 59-033558  6/1984  Japan .

Primary Examiner—Jack B. Harvey
Assistant Examiner—John Travis
Attorney, Agent, or Firm—Laff, Whitesel, Conte & Saret, Ltd.

[57] ABSTRACT

Shadow registers for processing interruption are provided in a CPU. When the control shifts to interruption routine, the shadow registers are used for the interruption routine by changing the use of ordinary registers thereto, and the ordinary registers are prohibited to be used during a period of the interruption. Subsequently to the finish of the interruption, the ordinary registers are re-used without the necessity of the store and the re-store of the ordinary registers.

2 Claims, 6 Drawing Sheets

METHOD AND APPARATUS FOR PROCESSING INTERRUPTION

FIELD OF THE INVENTION

This invention relates to a method and an apparatus for processing interruption and, more particularly, to an information processing method and an information processing apparatus which responds to external processing such as interruption in a computer system.

BACKGROUND OF THE INVENTION

An information processing apparatus comprises various registers for informing a system of a hardware structure or data format, and having specific areas on a memory for administrating processing status by the system.

If the contents of the routine followed by the registers are unduly broken off, the system does not work properly. Even if control is shifted to an external processing such as by an interruption, the contents of the registers can be utilized even at a routine for a jumped destination.

In an ordinary system, however, a former status is broken off, because the processing for the jumped destination uses the registers at the routine. Therefore, when the processing shifts to an external routine, the contents of the registers are preserved, and the control must be returned to the original routine, after the preserved registers are restored to the original state at the time of the return to the original routine.

FIG. 1 shows the shift of controls at an interruption process, and the state of registers at that time. When the interruption occurs, the control of a CPU shifts to an interruption routine. When the interruption finishes, the control usually returns to an instruction following an instruction which caused the interruption.

At this time, the registers are restored to their state at which the interruption started, so that the processing of the original routine continues with the ordinary operation routine subsequent to operation which occurred just prior to the start of the interruption. The preservation of the registers in the state they were in at the interruption routine is carried out for only the registers to be used at the interruption routine. There is no necessity to carry it out for all registers.

At any rate, a conventional information processing apparatus is provided with a memory having a work area for preserving the contents of the registers at interruption routine, wherein the preserved contents are broken off in the work area at the end of the interruption routine. For this reason, the store of the contents and the restore thereof are repeated in the work area each time there is an interruption routine.

In the case of a computer game machine, subsequent image process must be carried out during V and H blanks (vertical and horizontal retrace periods) having no image on a video screen. Even more, the process is an interruption process such as V blank interruption, H blank interruption, etc.

FIG. 2 shows an image display on a TV screen realized by scanning lines.

The scanning line runs left to right, and, when it reaches to the right end, it returns to the left end during a horizontal retrace period having no displayed image on the screen. On the other hand, the scanning line moves from the top to the bottom of the displayed image. When it reaches the bottom, it returns to the top of the image during a vertical retrace period having no displayed image on the screen.

Even a relatively long V blank occurring once in a 1/60 sec. period has a period of 3/242 sec. The H blank is extremely short as approximately 10M sec. Therefore, a time for the store and restore of registers is not negligible, because the processing of images to be next displayed must be done in these short periods. Therefore, there is a disadvantage in the conventional information processing apparatus in that a part of the process to be carried out in the retrace periods is omitted.

SUMMARY OF THE INVENTION

Accordingly, it is an object of the invention to provide a method and an apparatus for processing an interruption in which the store and the restore of registers are carried out with high speed at interruption routine.

According to a feature of the invention, a method for processing the interruption, comprises the steps of:

decoding an instruction of the interruption;

changing a use of an ordinary register to a use of a shadow register, a content of the ordinary register being held;

processing the interruption by using a content or routine in the shadow register; and returning to the use of the ordinary register, following the end of the interruption routine.

According to another feature of the invention, an apparatus for processing an interruption, comprises:

a CPU for processing the interruption;

an ordinary register for storing a predetermined content; and a shadow register for storing a content or routine necessary for carrying out the interruption, the shadow register being provided in the CPU;

wherein the shadow register is used, when the interruption is processed by the CPU.

A process to be carried out at the time of the jump to the interruption routine is defined as prologue and a process to be carried out at the time of the return to the jump source is defined as epilogue.

For the prologue, (1) the store of registers, and, (2) an initial value-set of a register to be used at the interruption routine are carried out, and for the epilogue, (3) the restore of the registers is carried out.

The above process is carried out each time of the shift to interruption routine. At the same routine, the same process is normally repeated. If a part of the process can be omitted, the process can be increased in speed.

In accordance with the above considerations the invention provides a CPU with a shadow register, so that interruption process starts without access to a register at the occurrence of the interruption.

The number of registers is large, and only a register to be used mainly at the time of the interruption routine is a shadow register. FIG. 3 shows a position of the shadow register.

When the control shifts to the interruption processing routine, a portion of the ordinary registers is changed to a shadow register, and a register (the portion in FIG. 3) corresponding to the shadow register can be no longer used.

Consequently, the store and the restore of a register at each time of occurrence is of interruptions become unnecessary, and there is no necessity to initialize a content of the shadow register, when the content of the shadow register is used at the former state.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
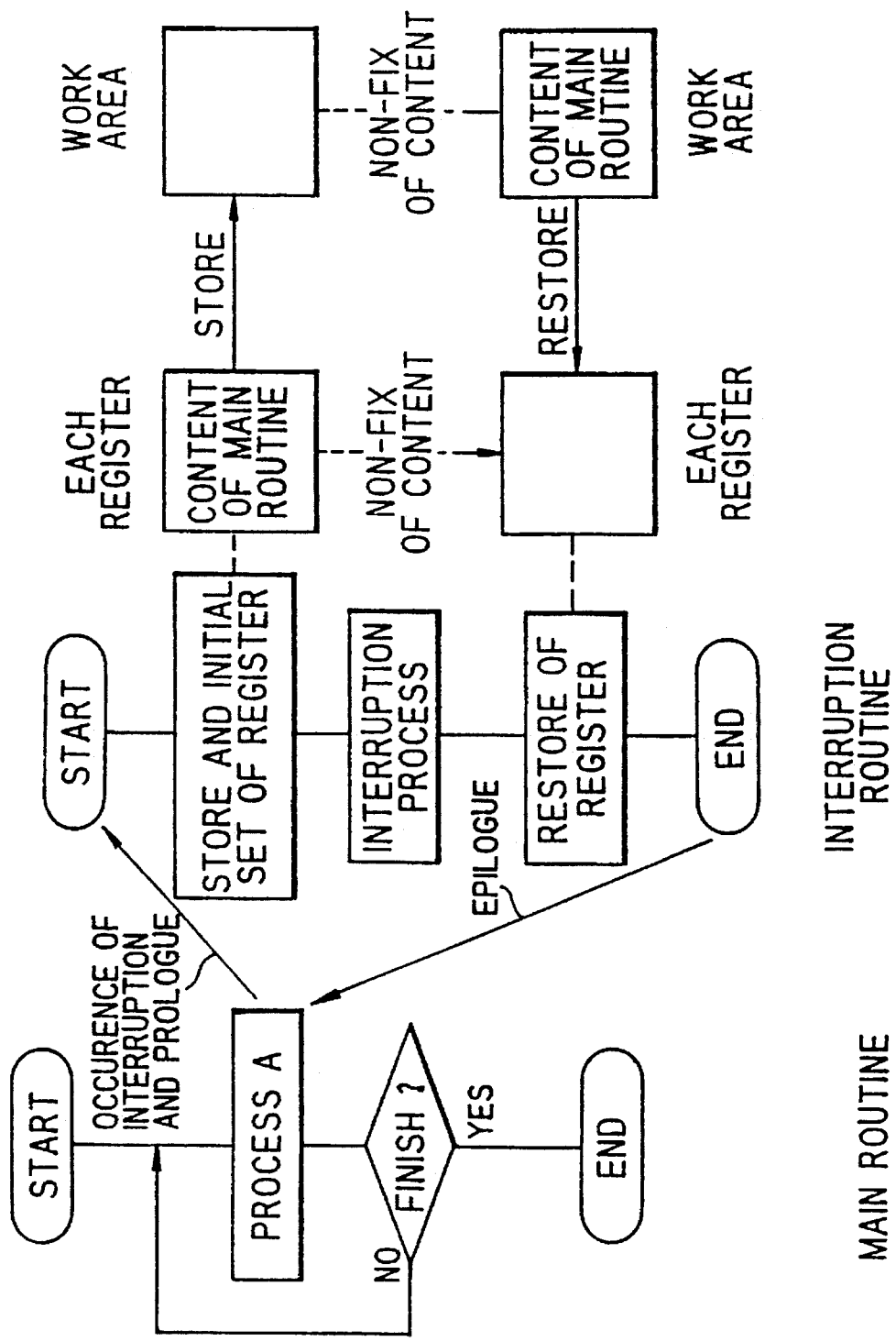
FIG. 1 is an explanatory diagram showing a conventional interruption processing, and the transition of a content of a register.
Figure 2:
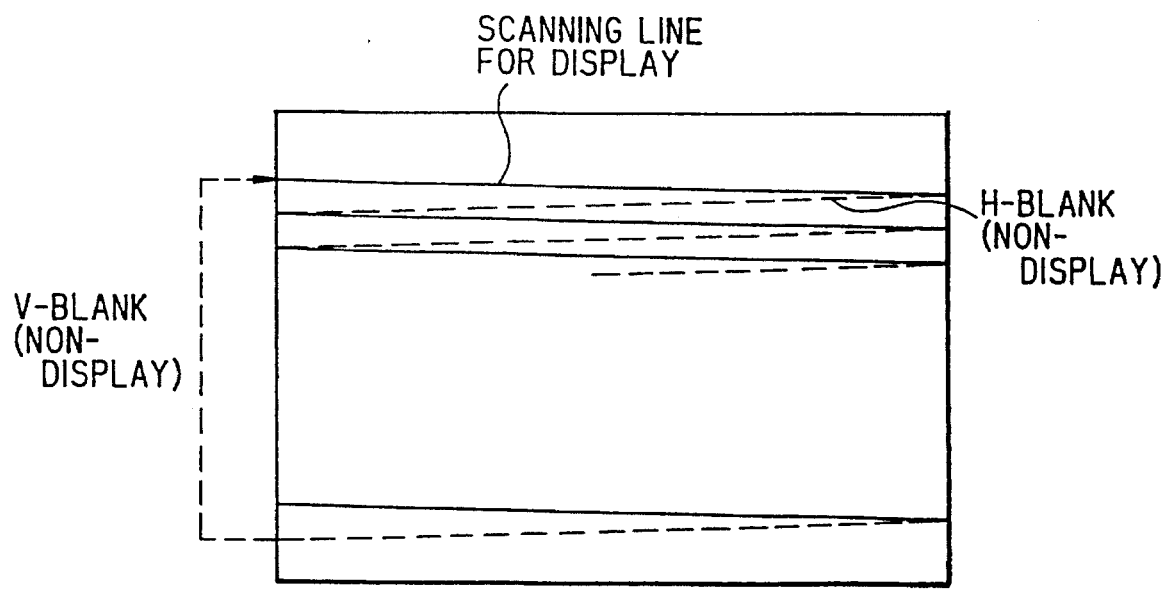
FIG. 2 is an explanatory diagram showing H and V blanking.
Figure 3:
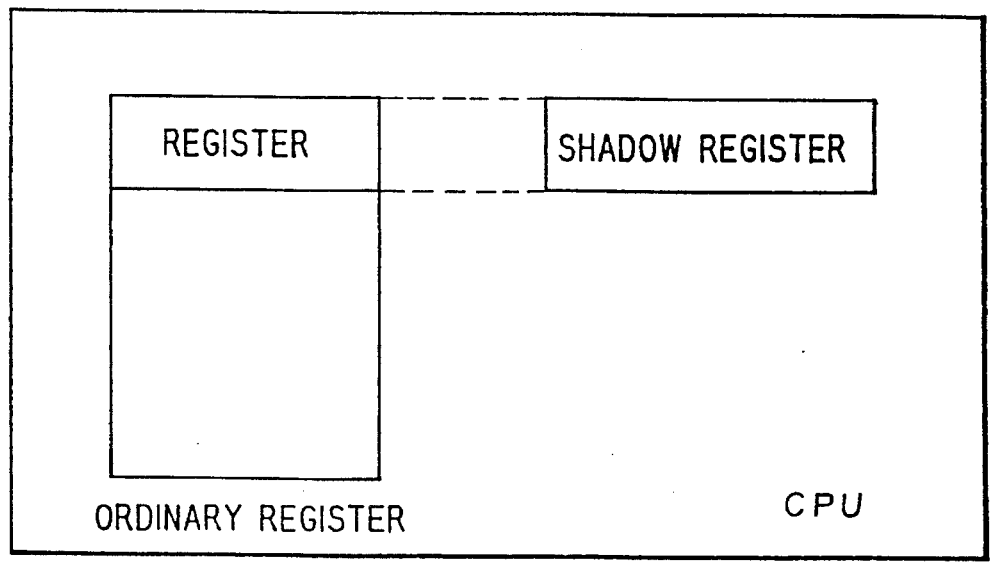
FIG. 3 is an explanatory diagram showing a position where a shadow register is provided.
Figure 4:
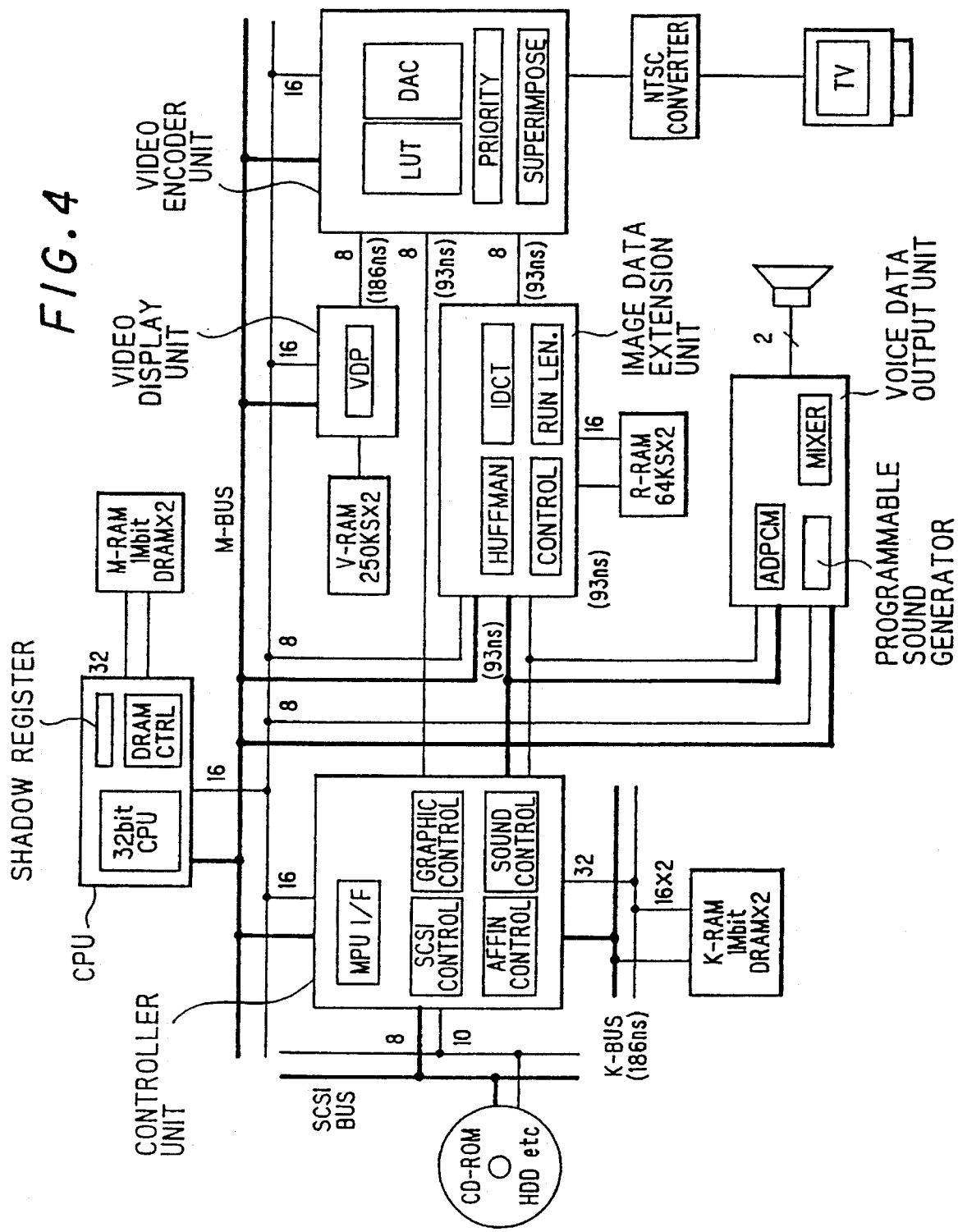
FIG. 4 is a block diagram showing a system of a computer game machine in a preferred embodiment according to the invention.

FIG. 4 is a block diagram showing a system for a voice and image processing apparatus in the preferred embodiment according to the invention. A CPU controls each IC (integrated circuit) apparatus represented by rectangular blocks in FIG. 4.

This processing apparatus comprises a game soft storing medium, such as CD-ROM, etc., a CPU of 32 bits, a control unit for transfer-control of image and voice data and for interfacing each apparatus, an image data extension and transformation unit, an image data output unit, a voice data output unit, a video encoder unit, a video display unit, etc. Each unit is an IC apparatus, and has a memory such as K-RAM, M-RAM, R-RAM, V-RAM, etc.

The CPU has a memory control function for controlling the DRAM via a memory support, an I/O control function for communicating with various peripheral devices via I/O ports, and an interruption control function, and is provided with a timer, parallel input and output ports, etc.

The video display unit reads display-data written into the V-RAM by the CPU. The read data is supplied to the video encoder unit to be displayed on the screen.

The controller unit has a built-in SCSI controller, into which image and voice data are supplied From an external memory apparatus such as the CD-ROM, etc., the supply being via an SCSI interface. The supplied data are once buffer stored in the K-RAM.

The priority of background image data for a natural picture is determined in the controller unit to be supplied to the video encoder unit by a one dot data unit.

Data-compressed motion picture (full color, pallet) data is supplied to the image data extension unit. The image data extension unit extends the data, and the extended data is supplied to the video encoder unit.

The video encoder unit carries out the process such as super-impose, color pallet regeneration, special effect, D/A conversion, etc., on data of VDP image, natural picture background image, and motion picture (full color, pallet) supplied from the video display unit, the controller unit, and the image data extension unit. Image signals encoded by the NTSC converter, to become NTSC signals, are supplied to the screen.

ADPCM video data read from the CD-ROM, etc. is buffer stored in the K-RAM in the same manner as image data, and is supplied to the video data output unit to be reproduced therein by the controller unit.

In the above embodied apparatus, each unit is an IC apparatus having an independent function. In addition, at each time when an H or V blank interruption occurs, each unit functions in accordance with interruption process during non-display periods.

Figure 5:
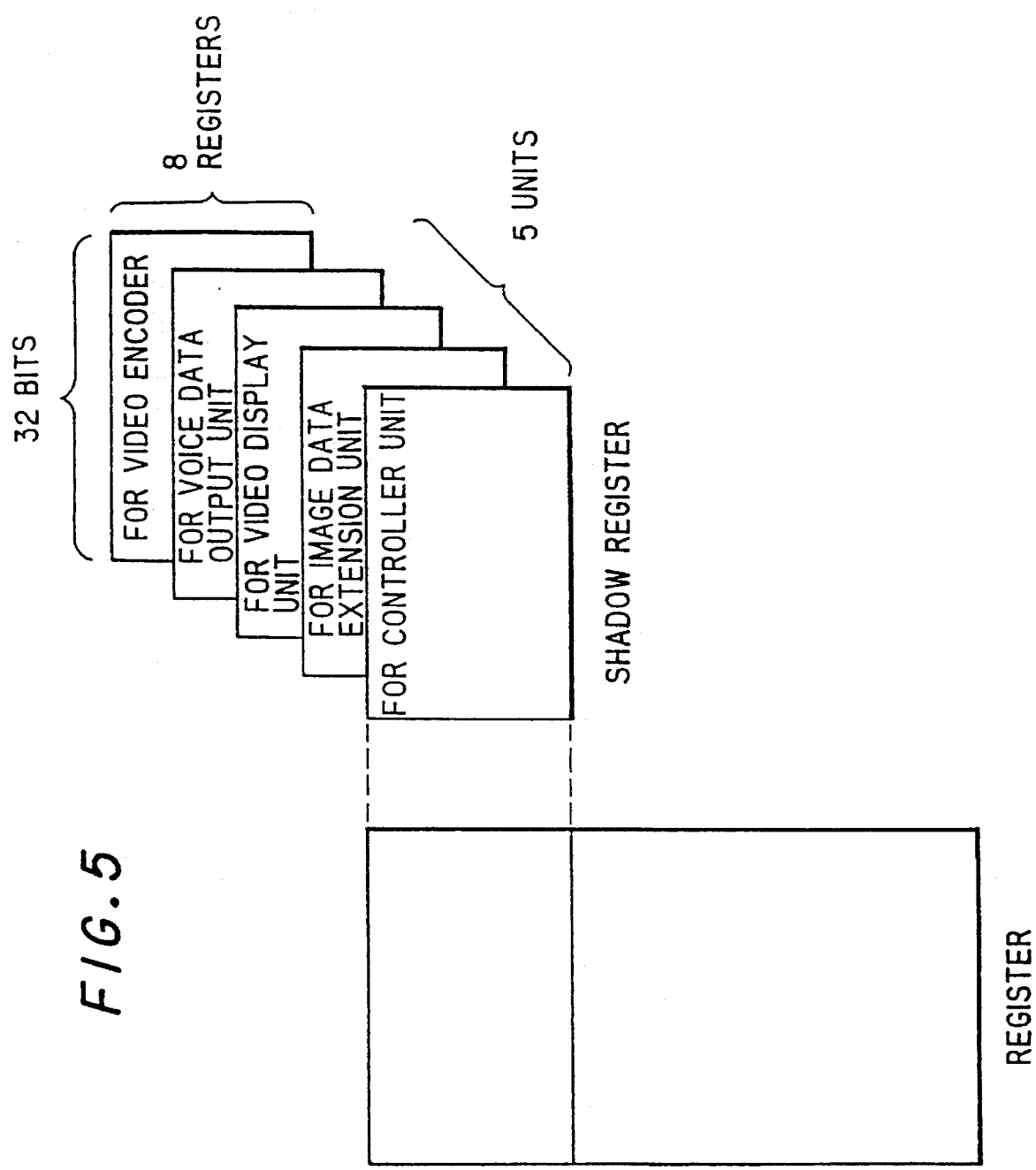
FIG. 5 is an explanatory diagram showing a format of a shadow register included in a CPU in the preferred embodiment.

For this purpose, the CPU is provided with shadow registers, each of which is assigned to a corresponding IC apparatus. FIG. 5 shows how the shadow register are provided to have the same contents therein.

Each ordinary register stores words of 32 bits, and each shadow register has the same formation as that of the ordinary register in a memory of the CPU. In this preferred embodiment, eight shadow registers are prepared to be used during an interruption routine.

When the control shifts to the interruption processing routine corresponding to each IC apparatus, the CPU automatically changes from the ordinary registers to the shadow registers corresponding to the IC apparatus.

In this interruption routine, no store and no restore of the registers are carried out. The shadow registers are directly used.

Figure 6:
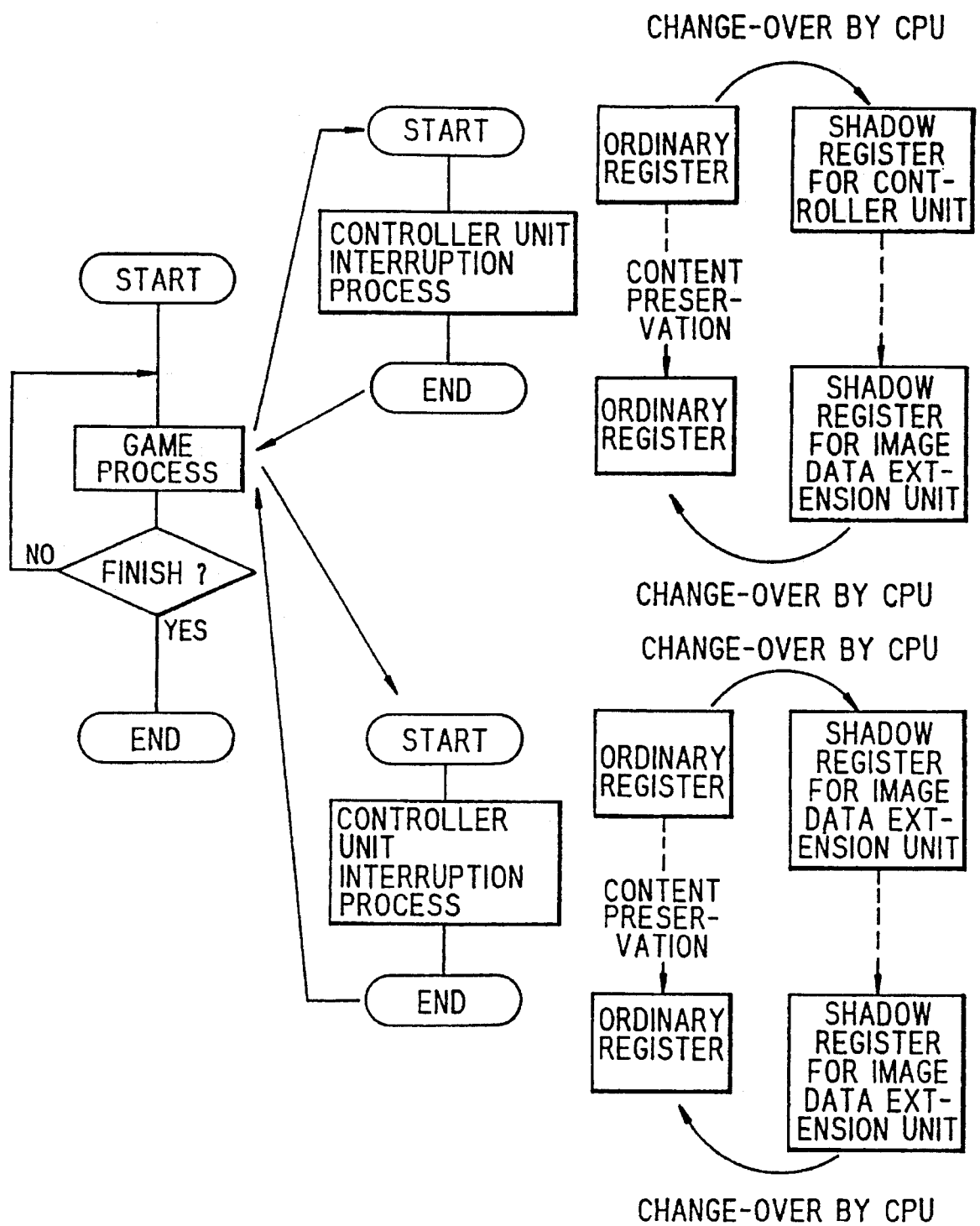
FIG. 6 is an explanatory diagram showing the invention using an interruption process and a register in the preferred embodiment.

FIG. 6 shows a flow of the operation, in the preferred embodiment. The initial setting of the shadow registers is not set out in the flow chart, because the former state can be used without change. However, there is a case where the initial set thereof is required.

Although FIG. 6 shows a parallel interruption process of the control unit and the image data extension unit, a case where the image data extension unit is called up from the control unit can be processed without problem.

Figure 7:
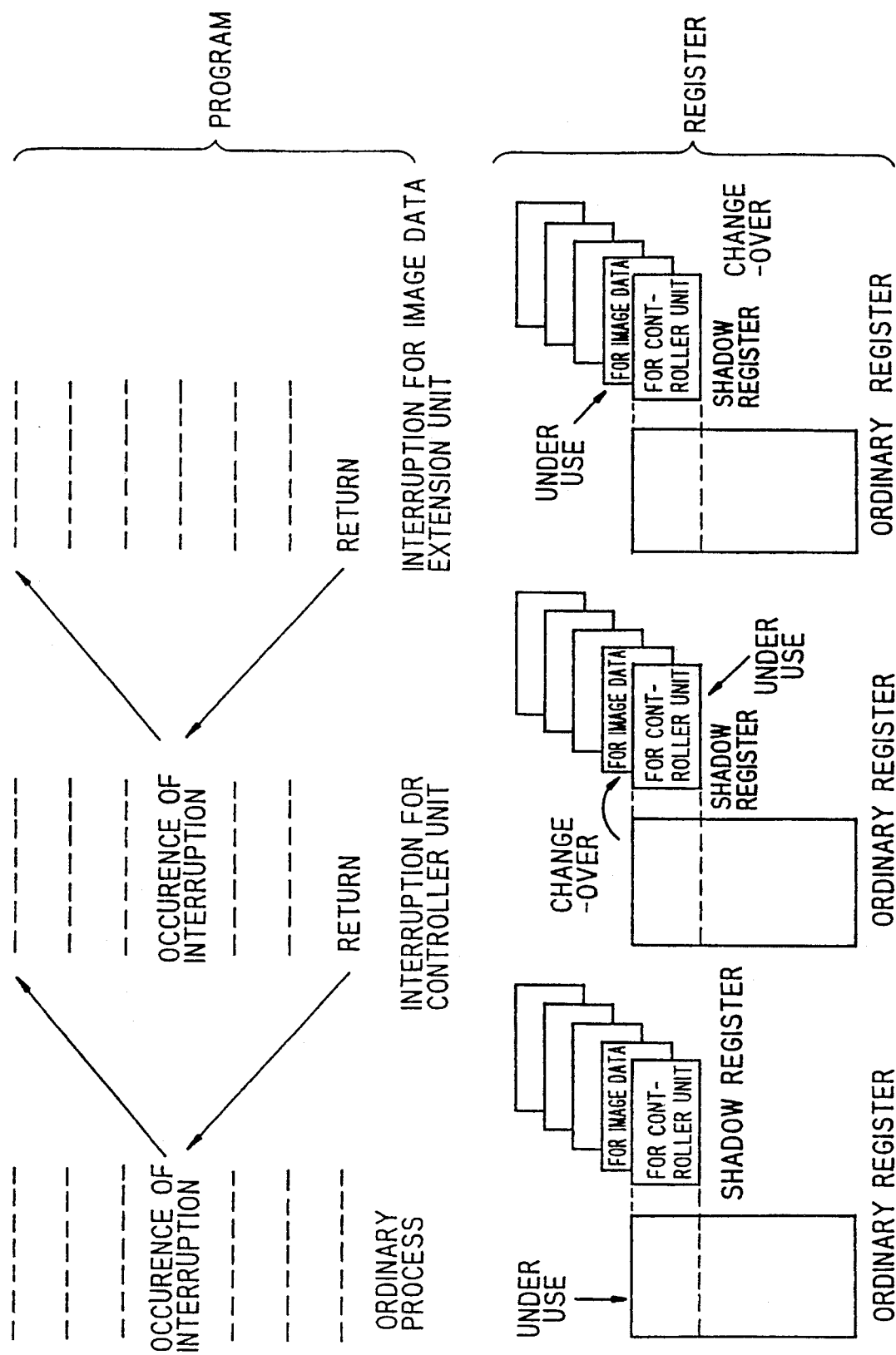
FIG. 7 is an explanatory diagram showing the interruption process having plurality of steps and a register in the preferred embodiment.

The latter case is explained in FIG. 7, wherein the control is transferred from the control unit to the image data extension unit by generating an interruption. When the control shifts to the interruption routine, the CPU changes to the shadow registers, so that the preservation state is held in the registers (including shadow registers) at the occurrence of the interruption, corresponding to the state of the shadow registers.

consequently, even if the control is returned from the interruption routine to the former routine, the control can re-start from a state just prior to the occurrence of the interruption, because the contents of the registers have been held.

In case of a computer game machine, an interruption occurs in a hardware system during an H or V blanking period, so that the explanations of the shadow registers have been made in connection with an interruption process so far. However, the concept of the shadow registers can be frequency used for an external process routine.

There are two points for shadow registers in the invention. The first point is that a special area is provided in a CPU. The second point is that the CPU automatically carries out the change-over to comply with respective processings.

That is, the store and the restore of registers which are carried out in the conventional processing apparatus become unnecessary to be carried out in the invention. It is not necessary to make a sense of shadow registers by a program due to the fact that the change-over is made in a hardware system, so that the same method of using a program as in the conventional processing method can be adopted in the invention.

For this reason, there are advantages in the invention in that processing speed becomes high, and the descriptions or writing of a program becomes simple. Especially, the advantages of the invention are significant in the case where subsequent image processing must be finished in a short time as required in a television game machine, etc.

Although the invention has been described with respect to a specific embodiment for a complete and clear disclosure, the appended claims are not to be thus limited but are to be construed as embodying all modification and alternative constructions that may occur to one skilled in the art which fairly fall within the basic teaching herein set forth.

What is claimed is

1. An apparatus for processing an interruption in data for a voice and an image processing system, said apparatus comprising:

a CPU for controlling a plurality of units to cause them to operate in prescribed manners responsive to voice and image data, said image data being for displaying an image on a TV screen having H and V blanking, said CPU processing an interruption in said data for a designated one of said units, said units being taken from a class consisting of a video encoder, a voice data output unit, a video display unit, an image data extension unit, and a controller unit;

an ordinary register for storing a predetermined content of said data; and a plurality of shadow registers for storing said data contents necessary for carrying out said interruption, said shadow registers being provided in said CPU, and said shadow registers being provided exclusively for units taken from said class consisting of said video encoder, said voice data output unit, said video display unit, said image data extension unit, and said controller unit;

one of said shadow registers being changed-over to be used from said ordinary register, when one of said units is designated for said interruption in accordance with an interpretation of a program by said CPU.

2. The apparatus of claim 1 and means responsive to an interruption signal for transferring control of said units from a normal data processing routine to an interruption routine, said CPU commanding a changeover in response to said interrupt signal to preserve the state of said data then existing in said ordinary and said shadow registers, and means responsive to an end of interruption signal for restarting control of said units responsive to said held data, whereby the control returns to a state of the data that existed when interruption occurred.

* * * * *